(12) United States Patent
Hannah et al.

(10) Patent No.: US 6,871,665 B2
(45) Date of Patent: Mar. 29, 2005

(54) AIRCRAFT OXYGEN VALVE HAVING KNOB WITH DISTINCTIVE POSITION INDICATOR

(75) Inventors: Gary Hannah, Shawnee, KS (US); Enrique A. Cordero, Overland Park, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 10/654,538

(22) Filed: Sep. 3, 2003

(65) Prior Publication Data

US 2005/0045231 A1 Mar. 3, 2005

(51) Int. Cl.$^7$ ............................................. F16K 37/00
(52) U.S. Cl. ..................................... 137/553; 137/556
(58) Field of Search ................................. 137/553, 556

(56) References Cited

U.S. PATENT DOCUMENTS

| | | | |
|---|---|---|---|
| 3,151,598 A | 10/1964 | Bourns et al. | |
| 3,183,885 A | 5/1965 | Venema | |
| 3,241,515 A | 3/1966 | Franklin | |
| 3,547,071 A | 12/1970 | Antrim et al. | |
| 3,910,308 A | 10/1975 | Mack | |
| 5,269,343 A | * 12/1993 | Trapp | 137/554 |
| 5,535,698 A | * 7/1996 | Trevisan | 137/556 |
| 5,769,118 A | 6/1998 | Lenberg | |
| 6,044,791 A | * 4/2000 | LaMarca et al. | 116/277 |
| 6,742,541 B2 | * 6/2004 | Pimouguet | 137/554 |

* cited by examiner

*Primary Examiner*—Kevin Lee
(74) *Attorney, Agent, or Firm*—Hovey Williams LLP

(57) ABSTRACT

A valve assembly (20) including a valve body (24) and a position-indicating knob assembly (28) is provided wherein the assembly (28) indicates three different valve positions, namely valve closed, partially opened and full open positions. The preferred assembly (28) includes a rotatable knob (44) including a viewing port (80) therein, together with an indicator ring (40) having three differently colored regions (62–66) corresponding to the different valve positions. A coupling assembly (42, 80, 70, 90) operably couples the knob (44) and indicator (40) so that the individual colored regions (62–66) come into view through the port (80) when the valve body (24) reaches the different valve positions. The assembly (28) is particularly useful with valves requiring greater than one revolution between valve closed and valve full open positions, such as valves used in conjunction with emergency oxygen cylinders on aircraft.

14 Claims, 5 Drawing Sheets

Valve Closed

Valve Open
One Quarter
Revolution

Valve Open
Slightly Less
Than One Half
Revolution

Valve Open
One Half
Revolution

Valve Open
Slightly More
Than One Half
Revolution

Valve Full Open
Six Revolutions

AIRCRAFT OXYGEN VALVE HAVING KNOB WITH DISTINCTIVE POSITION INDICATOR

BACKGROUND OF THE INVENTION

1. Field of the Invention

The present invention is broadly concerned with position indicating knob assemblies adapted for attachment to rotatable on-off valves in order to indicate via distinct and perceptible indicators the position of the valve in various positions such as valve closed, valve partially opened, and valve full open positions. In preferred forms, the invention is concerned with such knob assemblies, and the combination thereof with valve bodies, wherein the knob assembly includes a differently colored valve position indicator which displays respective colors corresponding to different valve positions.

2. Description of the Prior Art

Emergency oxygen supplies in aircraft are in the form of oxygen cylinders equipped with selectively operable valves. These valves are designed to open gradually in order to protect downstream components from pressure surges. Consequently, the valves typically require multiple rotations of a valve stem to move between closed and open positions. When such cylinders are installed in an aircraft, the valve is supposed to be in the full open position thereof, and it is lock-wired in this position. However, if the valve is only partially opened (e.g., only one revolution in a six revolution to open valve), the pilots panel reading will show the valve opened because positive oxygen pressure would exist, and the valve would be lock wired in this position. However, in the event of an emergency decompression, the partially opened valve would deliver insufficient emergency oxygen, and catastrophic results could ensue.

Conventional knob position indicators use simple on-off position pointers. This method is acceptable for valves that go from full closed to full open in less than one stem revolution. However, valves with greater than one revolution from full closed to full open cannot make use of a simple pointer. In some applications, an electromechanical approach has been utilized to sense the position of the valve via electrical switch components. A disadvantage of this approach is the vulnerability to displacement or misalignment of the switch components, such that the switch contacts close prematurely or not at all. Further, this approach cannot distinguish between three valve conditions (fully closed, partially open and full open) unless multiple switches are used. Finally, the switch concept is dependent on a source of electrical power and also requires circuitry to concert the switch signals to a form perceptible to users.

U.S. Pat. No. 3,910,308 describes a valve signal handle which is capable of indicating fill closed and full open position using different colors. However, this device is incapable of indicating an intermediate valve position between full open and full closed. U.S. Pat. Nos. 3,151,598, 3,183,885, 3,241,515, 3,547,071 and 5,769,118 all describe various valve and turn-indicating units making use of digitized counters. For example, U.S. Pat. No. 3,547,071 describes a turn indicator for showing the number of turns made by a shaft equipped with a knob or the like. A series of indicator numerals are provided so that each time the knob is turned one full revolution a new number is shown. These patents also describe combination devices which not only count revolutions, but also provide angular displacement indicators.

SUMMARY OF THE INVENTION

The present invention overcomes the problems outlined above and provides positioning indicating knob assemblies adapted for attachment to rotatable valve stems in order to provide plural position indicators which are perceptible and distinct. Broadly speaking, the knob assemblies of the invention include a rotatable knob, an indicator having first, second and third perceptible and distinct valve position indicators corresponding to the first, second and third different valve stem positions. A coupling assembly is provided between the knob and indicator so that the first position indicator becomes perceptible only when the valve stem is in the first position thereof, the second position indicator becomes perceptible only when the valve is in the second stem position, and the third position indicator becomes perceptible only when the valve is in the third stem position thereof.

In preferred forms, the knob includes a viewing port and the position indicators are individually colored regions of an indicator ring rotatable with the knob. As the knob is rotated, the coupling assembly serves to shift the indicator ring relative to the knob so that when the valve reaches the appropriate position, the proper colored region comes into registry with the viewing port.

The knob assemblies of the invention find particular utility in conjunction with aircraft oxygen cylinders, and permit visual inspection of the cylinder valves in order to confirm the position of the valves. Thus, during and after installation of the cylinders it is a simple matter to visually confirm that the valves are indeed in the requisite full open position, by simply looking at the valve color indicator port

BRIEF DESCRIPTION OF THE DRAWINGS

FIG. 4 is a fragmentary view in partial vertical section illustrating the valve assembly of the invention mounted on a conventional pressurized bottle containing oxygen or other gas;

DETAILED DESCRIPTION OF THE PREFERRED EMBODIMENT

Figure 1:
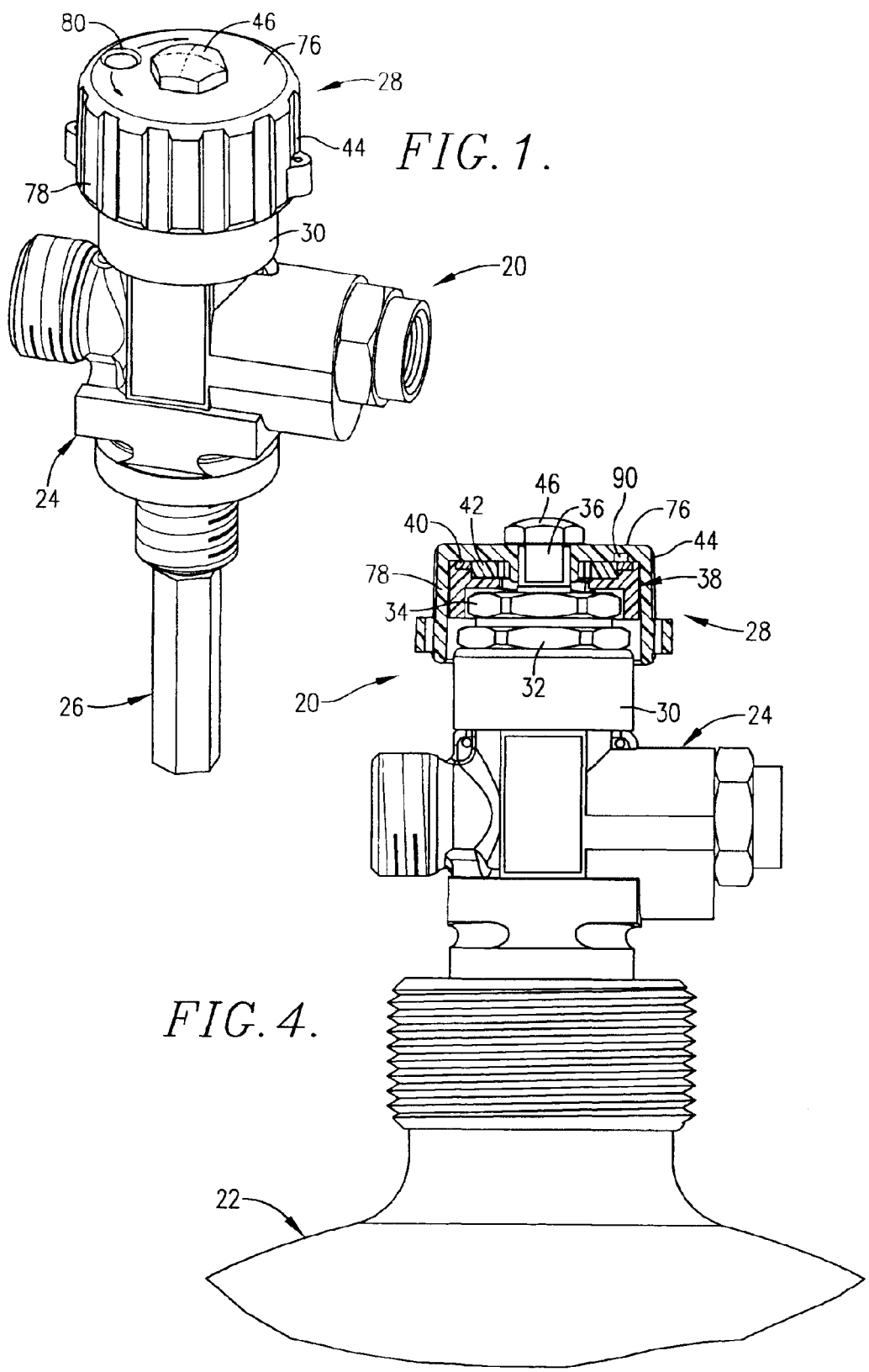
FIG. 1 is a perspective view of a valve assembly in accordance with the invention equipped with a specialized position-indicating knob assembly.

Turning now the drawings, FIG. 1 illustrates a valve assembly 20 in accordance with the invention, whereas FIG. 4 depicts the assembly 20 operatively threaded into the neck of a high pressure oxygen bottle 22. The assembly 20 broadly includes a main valve body 24, depending draw tube 26 and knob assembly 28. The valve body 24 and draw tube 26 are entirely conventional, and are used for valving the bottle 22 or any other source of pressurized gas or liquid. Accordingly, the constructional details and operation of these components need not be described in detail. It will be noted, however, that the valve body 24 has, adjacent its upper end, a circular block 30 surmounted by a pair of nuts 32 and 34. A rotatable, flattened valve stem 36 extends upwardly from block 30 and through the nuts 32, 34. As will be readily-understood rotation of the valve stem 36 effects opening and closing of the valve assembly 20.

Figures 2, 3:
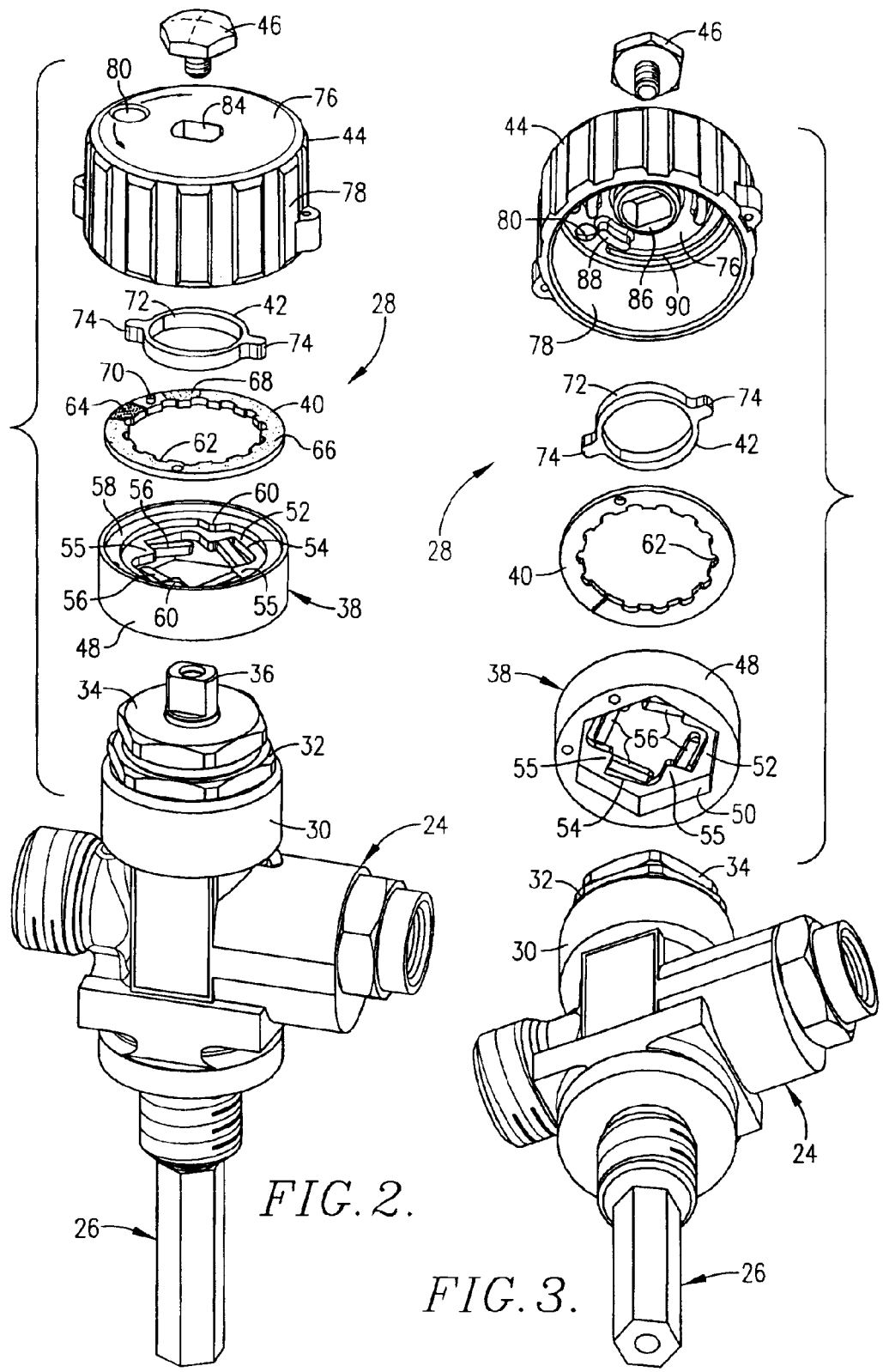
FIG. 2 is a perspective view similar to that of FIG. 1, but illustrating the knob assembly in exploded relation.
FIG. 3 is a perspective view similar to FIG. 2, but showing the valve assembly and exploded knob assembly in a different perspective.

Referring now to FIGS. 2 and 3, it will be seen that the knob assembly 28 is mounted atop block 30 and the nuts 32, 34, and is operably coupled with valve stem 36. The overall assembly 28 includes, from bottom to top, a detent block 38, indicator ring 40, elastomeric spring ring 42 and rotatable knob 44. A screw 46 passes downwardly through the knob 44 and is threadably received within the bore of stem 36 in order to affix the entire assembly 28 to the valve body 24.

In detail, the detent block 38 includes a main, upright circular sidewall 48 presenting a hexagonal bottommost opening 50 designed to accommodate upper nut 34. A lower spring-supporting segment 52 is located above the opening 50 and presents four equidistantly spaced, elongated recesses 54 with intermediate projections 55. An elongated, slightly downwardly inclined spring finger 56 extends from each projection 55 along the length of the adjacent recess 52. Additionally, the block 38 presents an upper, generally annular indicator-supporting segment 58 which includes a pair of opposite, inwardly extending detents 60.

The indicator ring 40 is of split-ring construction and has a total of thirteen strategically positioned recesses 62 formed along the inner surface thereof. The ring has three distinct colored regions on the upper face thereof, namely a red region 64, a yellow region 66 and a green region 68. An upstanding boss 70 is located between the regions 64 and 68.

The spring ring 42 includes a substantially circular segment 72 and a pair of opposed, outwardly extending, integral ears 74. It will be noted that the thickness of the segment 72 is reduced somewhat at the regions of the ears 74 which is important for purposes to be described. The ring 42 may be formed of any suitable resilient, elastomeric material.

The knob 44 includes a substantially planar upper wall 76 and a depending, ribbed skirt 78. The upper wall is equipped with a circular viewing port 80 as well as a central, screw-receiving opening 84. The underside of upper wall 76 includes a central, depending, stem-receiving boss 86 designed to receive and accommodate valve stem 36, along with four depending lugs 88, positioned as two opposing lug pairs which are slightly spaced apart as best illustrated in FIGS. 5–10. Finally, a circular slot 90 is provided along the underside of wall 76 and which extends a substantial distance around the periphery of the wall.

Figure 11:
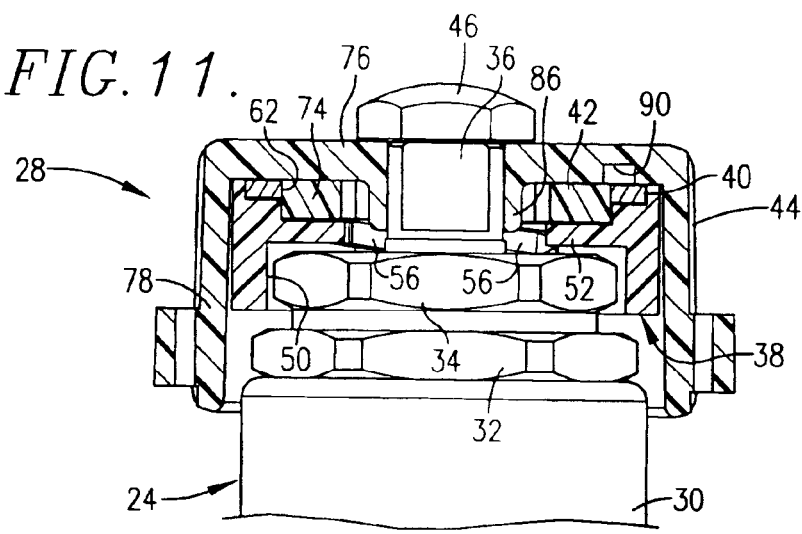
FIG. 11 is a vertical sectional view taken along line 11—11 of FIG. 6.
Figure 12:
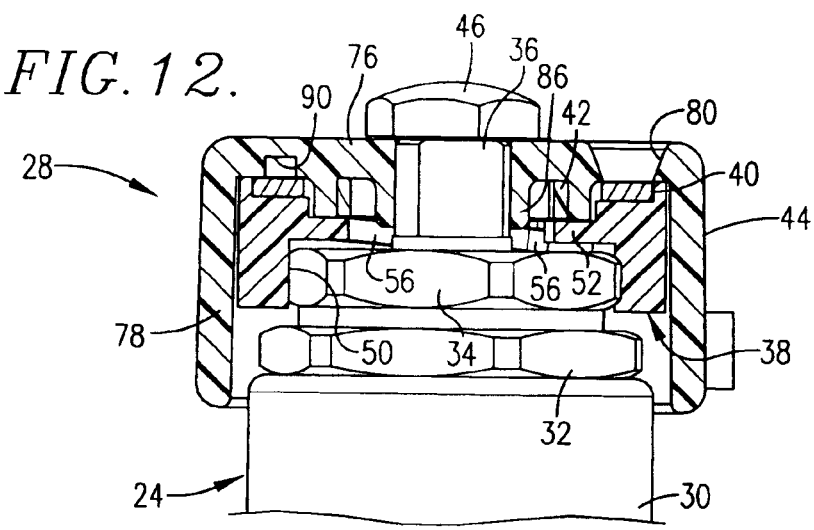
FIG. 12 is a vertical sectional view taken along line 12—12 of FIG. 5.
Figure 13:
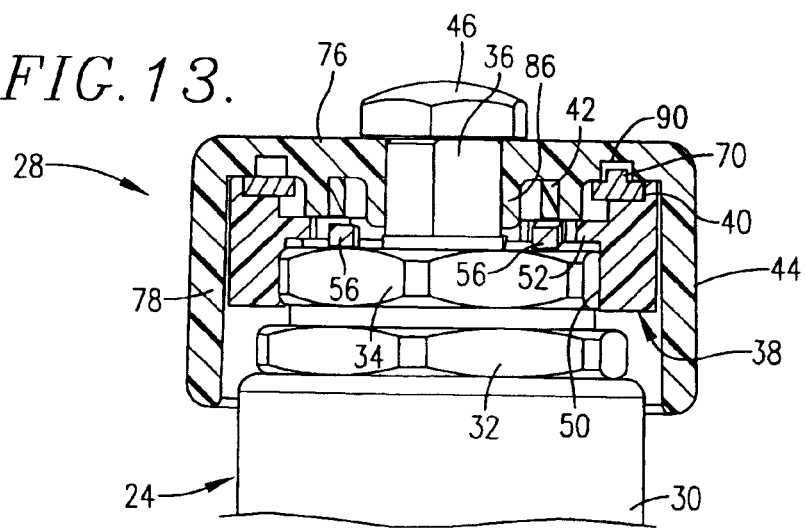
FIG. 13 is a vertical sectional view taken along line 13—13 of FIG. 7.

The assembled relationship of the components of knob assembly 28 is best depicted in FIGS. 11–13. In particular, the detent block 38 is positioned over the upper nut 34, with the latter received within the opening 50. The lower ends of the inclined spring fingers 56 engage the upper surface of nut 34 as best seen in FIG. 13, in order to accommodate any dimensional irregularities in the components of the assembly to insure smooth operation thereof. The spring ring 42 is seated on the upper surface of lower segment 52 with the ears 74 thereof projecting between the opposed pairs of knob lugs 88. The ring 40 is positioned on the upper surface of segment 58 with the ears 74 located within opposed ring recesses 62. The knob 44 receives upstanding valve stem 36 within boss 86 and the screw 46 is treaded into the stem bore, such that skirt 78 surrounds all of the internal components of the knob assembly. During operation of the knob assembly described in detail below, the detent block 38 remains stationary, while the knob 44, indicator ring 40 and spring ring 42 rotate relative to the detent block. The spring ring 42, lugs 88, boss 70 and slot 90 cooperatively form a coupling assembly serving to operatively couple the knob 44 and indicator ring 40 so that the respective colored regions 64-68 of the ring 40 are positioned beneath viewing port 80 when the valve is in its fully closed, partially open and full open positions, respectively.

Operation

Figure 5:
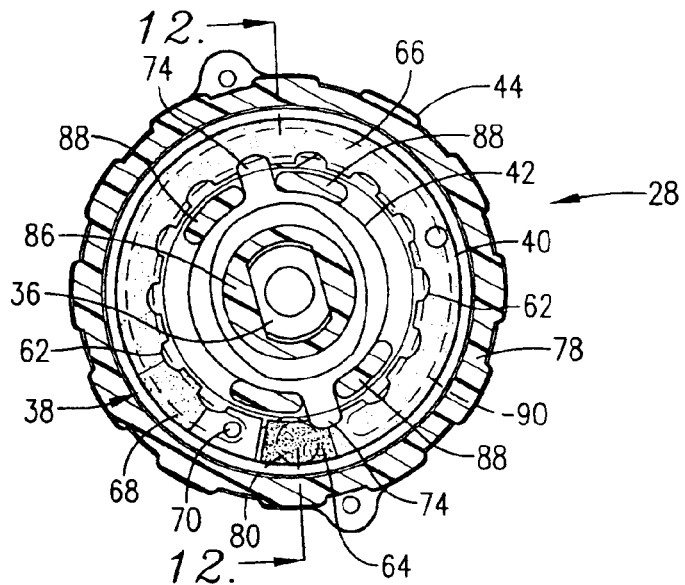
FIG. 5 is a horizontal sectional view of the preferred knob assembly and depicting the latter in the closed position of the valve assembly.
Figure 6:
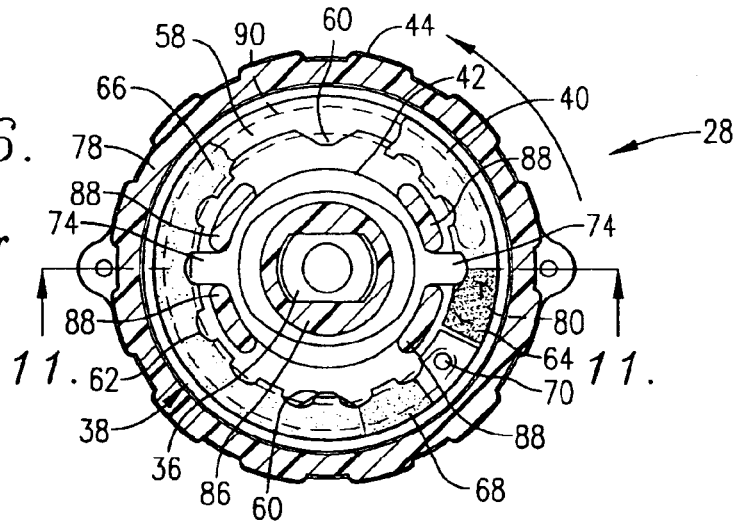
FIG. 6 is a view similar to that of FIG. 5, but illustrating the knob assembly during opening of the valve assembly.

Attention is first directed to FIGS. 5 and 12 which illustrate the position of the knob assembly 28 when the valve 24 is in the fully closed position. In particular, in this orientation one of the ears 74 of spring ring 42 is located within the recess 62 situated adjacent the counterclockwise end of red colored region 64, with the opposed ear 74 being located in the opposite recess 62; also, boss 70 is seated within slot 90 and remains so throughout knob movement. As such, the user would perceive a red color through the viewing port 80, indicating that the valve is fully closed. FIG. 6 illustrates the condition of the assembly 28 when the assembly is opened one-quarter turn. In particular, it will be seen that turning of the knob 44 simultaneously turns the ring 42 because of the driving connection of lugs 88 on opposite sides of the ears 74. Correspondingly, the ring 40 is also rotated owing to the location of the ears 74 within the previously described recesses 62. During this one-quarter turn travel, there is no relative movement between the knob 44 and ring 40, so that a red color is still observed through the port 80.

Figure 7:
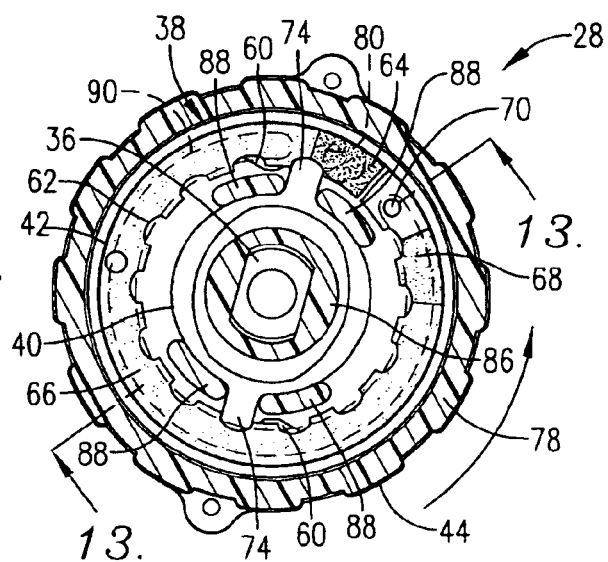
FIG. 7 is a view similar to that of FIG. 6, but showing the knob assembly in a further rotated condition.
Figure 8:
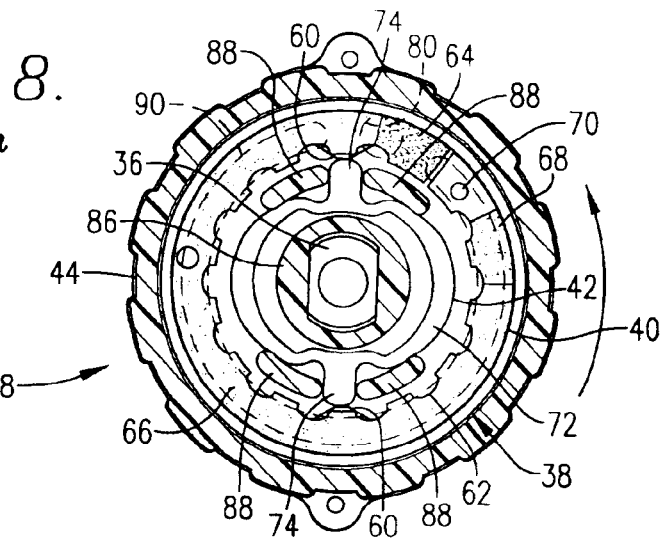
FIG. 8 is a view similar to that of FIG. 6, but depicting the knob assembly during deformation of the resilient ring forming a part of the knob assembly.
Figure 9:
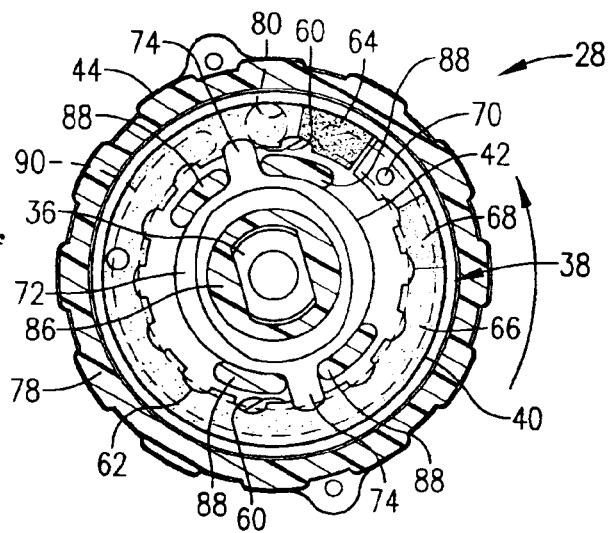
FIG. 9 is a view similar to that of FIG. 6, but showing the condition of the knob assembly after the knob is opened one-half revolution.
Figure 10:
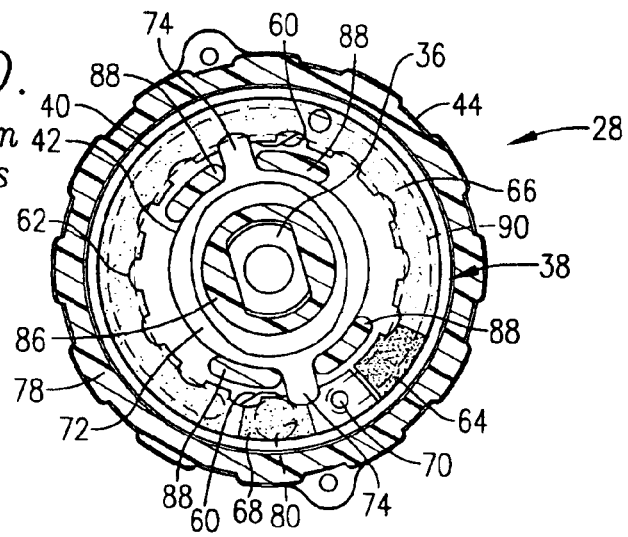
FIG. 10 is a view similar to that of FIG. 6 but depicting the knob assembly in its full open position after six knob revolutions.

FIG. 7 illustrates the condition of the knob assembly 28 at a position just slightly less than one-half revolution and prior to the ears 74 encountering the detents 60. Here again, the ring 42 has been rotated along with the knob 44, and the ring 40 is similarly been rotated. FIG. 8 illustrates the operation of the assembly 28 when the ears 74 encounter the detents 60. As this occurs, the resilient ring 42 is deformed such that the ears 74 are retracted from the original recesses 62 and, during continued rotation, the ring 42 is rotated slightly relative to the indicator 40 until, as seen in FIG. 9, the ears 74 seat within the next adjacent pair of ring recesses 62. In this orientation, it will be noted that the port 80 is now above the yellow colored region 66, indicating that the valve is partially opened.

As the knob 44 is further rotated another one-half revolution, the ears 74 of ring 42 again encounter the detents 60, which thereby shifts the ears into the next set of opposed recesses 62.

This sequence continues for an additional five revolutions of the knob assembly; and owing to the length of the yellow colored section 66, throughout this valve opening operation a yellow color is observed through viewing port 80. At the end of the sixth revolution of the knob assembly, the ears 74 again encounter the detents 60, causing the ears 74 to seat within the recess 60 adjacent the counterclockwise end of green colored region 68, and the opposed recess. In this valve full open position, a green color is then seen through the port 80.

Thus, during rotation of the knob assembly 28, the coupling assembly between the knob 44 and indicator ring 40 serves to sequentially change the relative position between the knob and indicator ring in a stepwise fashion. Of course, this operation is reversed during the closing of the valve, i.e, the indicator color seen through port 80 is initially green (indicating valve fully open), and then changes to yellow (indicating valve partially open) for five and one-half revolutions, and then changes to red (indicating valve closed) through the last one-half revolution.

While in the illustrated embodiment the valve assembly 20 requires six full rotations of knob assembly between full closed and full opened positions, it will be appreciated that a valve requiring a different number of revolutions could be used. In this case, the number and location of the recesses 62 should be adjusted so as to maintain the desired color indications in correlation with different valve positions.

We claim:

1. A valve assembly comprising:
 a valve body having a valve stem rotatable between valve closed, valve partially open and valve open positions; and
 a position-indicating knob assembly operatively secured to said stem, including a rotatable knob, an indicator having first, second and third perceptible and distinct valve position indicators corresponding to said valve closed, valve partially open and valve fill open positions, and a coupling assembly operably coupling the knob and indicator so that said first position indicator becomes perceptible when the valve stem is in the valve closed position thereof, said second position indicator becomes perceptible when the valve stem is in the valve partially open position, and said third position indicator becomes perceptible when said valve stem is in the valve full closed position, said knob having a viewing port, said position indicators being individually viewable through said port.

2. The assembly of claim 1, said knob having an upper wall and a depending skirt, said viewing port being provided in said upper wall.

3. The assembly of claim 1, said indicator comprising an annular body, said first, second and third position indicators being differently colored segments of said annular body.

4. The assembly of claim 1, said coupling assembly operable to change the relative position of said knob and indicator during rotation of said knob.

5. The assembly of claim 4, said indicator comprising an annular body rotatable with said knob, said coupling assembly including mechanism for changing the position of the indicator relative to said knob.

6. The assembly of claim 5, said mechanism comprising a resilient spring member having a pair of outwardly projecting ears and rotatable with said knob, said indicator having a plurality of ear-receiving recesses, and detents cooperable with said ears for selectively deforming the spring member and causing said ears to retract from said recesses, whereby the ears after passing from the detents are received within different ones of said recesses.

7. A position indicating knob assembly adapted for attachment to a rotatable valve stem, said knob assembly comprising a rotatable knob, an indicator having first, second and third perceptible and distinct valve position indicators corresponding to first, second and third different valve stem positions, and a coupling assembly operably coupling the knob and indicator so that said first position indicator becomes perceptible only when the valve stem is in the first stem position, said second position indicator becomes perceptible only when the valve stem is in the second stem position, and said third position indicator become perceptible only when the valve stem is in the third valve stem position, said knob having a viewing port, said position indicators being individually viewable through said port.

8. The assembly of claim 7, said knob having an upper wall and a depending skirt, said viewing port being provided in said upper wall.

9. The assembly of claim 7, said indicator comprising an annular body, said first, second and third position indicators being differently colored segments of said annular body.

10. The assembly of claim 7, said coupling assembly operable to change the relative position of said knob and indicator during rotation of said knob.

11. The assembly of claim 10, said indicator comprising an annular body rotatable with said knob, said coupling assembly including mechanism for changing the position of the indicator relative to said knob.

12. The assembly of claim 11, said mechanism comprising a resilient spring member having a pair of outwardly projecting ears and rotatable with said knob, said indicator having a plurality of ear-receiving recesses, and detents cooperable with said ears for selectively deforming the spring member and causing said ears to retract from said recesses, whereby the ears after passing from the detents are received within different ones of said recesses.

13. A valve assembly comprising:
 a valve body having a valve stem rotatable between valve closed, valve partially open and valve open positions; and
 a position-indicating knob assembly operatively secured to said stem, including a rotatable knob, an indicator having first, second and third perceptible and distinct valve position indicators corresponding to said valve closed, valve partially open and valve full open positions, and a coupling assembly operably coupling the knob and indicator so that said first position indicator becomes perceptible when the valve stem is in the valve closed position thereof, said second position indicator becomes perceptible when the valve stem is in the valve partially open position, and said third position indicator becomes perceptible when said valve stem is in the valve fill closed position, said coupling assembly operable to change the relative position of said knob and indicator during rotation of said knob, said indicator comprising an annular body rotatable with said knob, said coupling assembly including mechanism for changing the position of the indicator relative to said knob.

14. A position indicating knob assembly adapted for attachment to a rotatable valve stem, said knob assembly comprising a rotatable knob, an indicator having first, second and third perceptible and distinct valve position indicators corresponding to first, second and third different valve stem positions, and a coupling assembly operably coupling the knob and indicator so that said first position indicator becomes perceptible only when the valve stem is in the first stem position, said second position indicator becomes perceptible only when the valve stem is in the second stem position, and said third position indicator become perceptible only when the valve stem is in the third valve stem position, said coupling assembly operable to change the relative position of said knob and indicator during rotation of said knob, said indicator comprising an annular body rotatable with said knob, said coupling assembly including mechanism for changing the position of the indicator relative to said knob.

* * * * *